(12) United States Patent
Katagiri et al.

(10) Patent No.: US 6,295,420 B1
(45) Date of Patent: Sep. 25, 2001

(54) DRIVE FORCE TRANSMISSION DEVICE FOR CAMERA

(75) Inventors: Moriya Katagiri; Yukihiko Sugita; Yoshiyuki Kitahara, all of Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/442,964

(22) Filed: Nov. 18, 1999

Related U.S. Application Data

(62) Division of application No. 08/927,612, filed on Sep. 11, 1997, now Pat. No. 6,039,476.

(30) Foreign Application Priority Data

Sep. 13, 1996 (JP) .................................................. 8-243547

(51) Int. Cl.[7] .................................................. G03B 1/00
(52) U.S. Cl. .................................... 396/387; 396/418
(58) Field of Search ...................................... 396/418, 387

(56) References Cited

U.S. PATENT DOCUMENTS 4,304,480 * 12/1981 Fukahori et al. ..................... 396/418
4,351,595 * 9/1982 Date et al. ........................... 396/418
5,337,108 * 8/1994 Kihara et al. ........................ 396/387

FOREIGN PATENT DOCUMENTS 06-347876-A * 12/1994 (JP) .
07-43801-A * 2/1995 (JP) .
08-304894-A * 11/1996 (JP) .

* cited by examiner

Primary Examiner—D. Rutledge
(74) Attorney, Agent, or Firm—Volpe and Koenig, P.C.

(57) ABSTRACT

A film drive mechanism for a camera, in which a drive force of a motor is transmitted through a differential gear mechanism to a wind shaft and a rewind shaft and is also transmitted through a screw gear to a spool shaft or a fork shaft whereby, operations of winding and rewinding film are performed. The rewind shaft is placed in such a manner as to be inclined to the drive shaft of the differential gear mechanism. Also, a pair of engaging gears in the drive force transmission device are aligned so that their axes of rotation are oblique to one another. This film drive mechanism requires small space than conventional designs and is small in weight and is advantageous for the cost thereof.

5 Claims, 10 Drawing Sheets

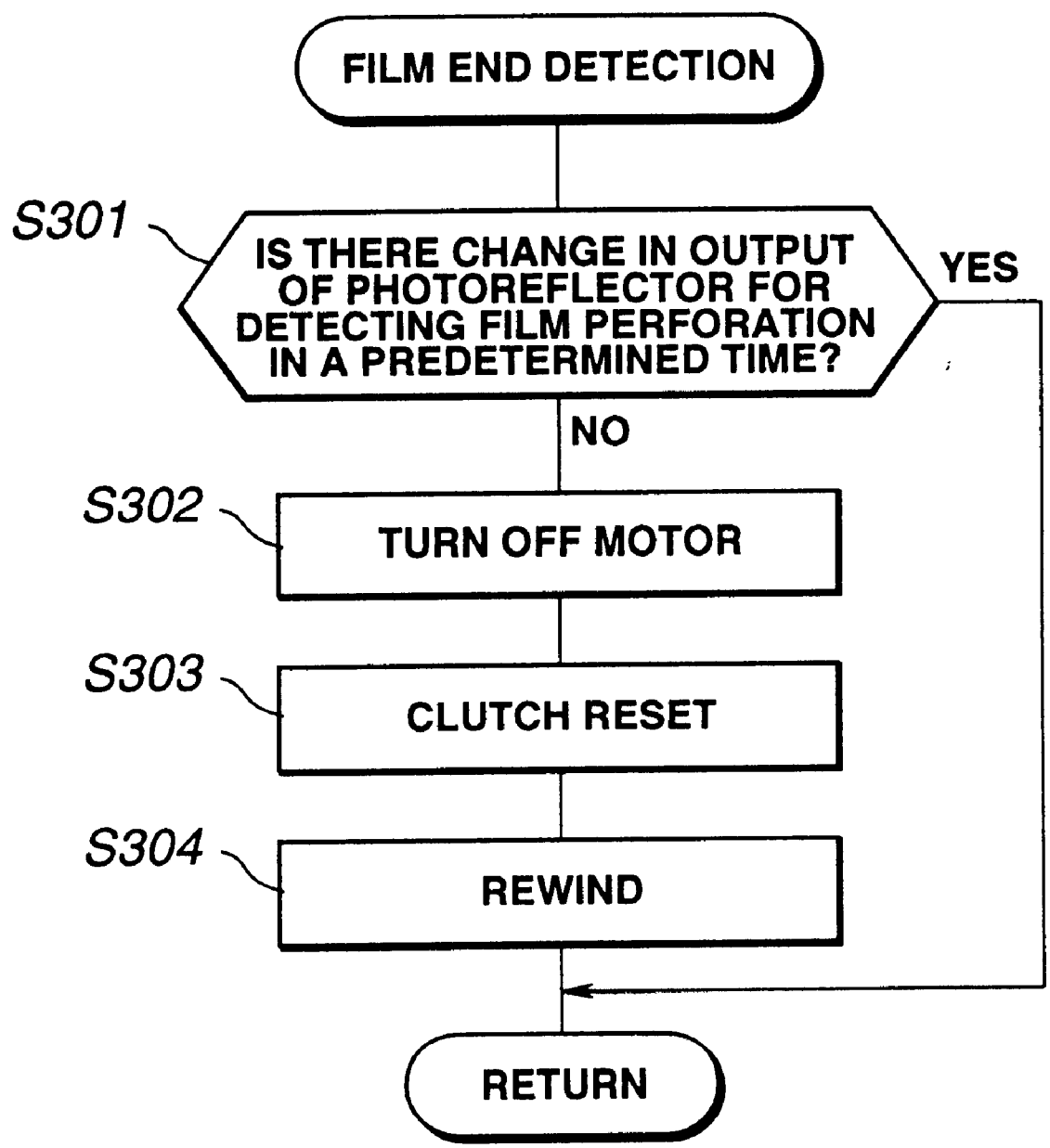

DRIVE FORCE TRANSMISSION DEVICE FOR CAMERA

This application is a divisional of application Ser. No. 08/927,612 filed Sep. 11, 1997 now U.S. Pat. No. 6,039,476.

BACKGROUND OF THE INVENTION

1. Field of the Invention

The present invention relates to a drive force transmission device for driving a driven portion of a camera.

2. Description of the Related Art

Conventional drive force transmission device for a camera, which has been previously proposed in Japanese Unexamined Patent Publication No. 8-304894 Official Gazette, is intended for use in a camera incorporating a drive mechanism adapted to select and drive a plurality of driven systems. In the aforementioned camera, a drive force from a drive source is selectively transmitted to winding means or rewinding means through a drive mechanism constituted by a plurality of connected gears.

However, in the case of the aforesaid conventional drive force transmission device disclosed in Japanese Unexamined Patent Publication No. 8-304894 Official Gazette, it is necessary for transmitting to place a plurality of gear transmission systems constituted by spur gears therein. Thus, necessary space increases, so that it is inevitable to increase size. Moreover, when reducing the sizes of the gears so as to downsize the camera, the transmission efficiency of the device is degraded. Further, the number of parts or components increases. Thus, such a camera is disadvantageous due to the cost thereof. Therefore, the conventional drive force transmission device has encountered such serious problems in optimization of gear placement.

Hitherto, power transmission through a gear train composed of spur gears has been generally used. However, in the case that there are a plurality of transmission paths which are long, there are too many gears to be contained in a camera. Consequently, the conventional drive force transmission device has a disadvantage that the transmission efficiency is deteriorated.

Further, conventional drive force transmission devices for cameras, which have been previously proposed in Japanese Unexamined Patent Publication Nos. 6-347876 and 7-43801 Official Gazettes, respectively, are intended for use in film feeders of cameras. Thus, the lead angles of helical gears of the drive force transmission system are set at predetermined values, respectively. Moreover, it is realized that both a spool gear and a winding gear for film are driven according to the magnitude of the drive force from the drive source, alternatively, the spool gear and the winding gear are selectively driven according thereto.

However, the aforementioned drive force transmission devices disclosed in Japanese Unexamined Patent Publication Nos. 6-347876 and 7-43801 Official Gazettes, respectively, employ a mechanism in which two rotary shafts are coupled to each other or uncoupled from each other in a line. Thus, the conventional drive force transmission devices have an inconvenience in that a space, in which the rotary shafts move, is needed, and that furthermore, the lateral size of the camera is increased. Moreover, the helical gear should be designed so that two rotary shafts are coupled or uncoupled in a line. Additionally, two rotary shafts are coupled and uncoupled Therefore, it is necessary to enhance the accuracy of the helical gear and a gear to be engaged therewith. Furthermore, it is necessary for preventing the degradation in transmission efficiency to enhance the accuracy of each coupling portion for coupling the two rotary shafts. Consequently, the conventional drive force transmission device is disadvantageous due to cost thereof.

SUMMARY AND OBJECT OF THE INVENTION

The present invention is accomplished in view of the aforementioned problems of the conventional drive force transmission device.

Accordingly, an object of the present invention is to provide a drive force transmission device for a camera, which is compact and has a small occupied space, without deteriorating the transmission efficiency thereof.

To achieve the foregoing object, in accordance with an aspect of the present invention, there is provided a drive force transmission device for a camera, by which a drive force is transmitted from a drive source to a plurality of drive mechanisms such as a film drive unit and a lens drive mechanism of the camera. This drive force transmission device comprises: input-side gears each rotated by a drive force transmitted from the aforesaid drive source; output-side gears each for driving the aforesaid drive unit; a plurality of drive shafts for transmitting a rotation of the aforesaid input-side gear to the aforesaid output-side gear; and drive force switching means for changing the input-side gear to which a drive force is transmitted.

In the case of an embodiment of the aforesaid drive force transmission device for a camera according to the present invention, a plurality of drive shafts are provided on an almost flat surface of a bottom portion of the camera in such a manner as to extend nearly in parallel with a film feeding direction.

Other features, objects and advantages of the present invention will become apparent from the following description of a preferred embodiment with reference to the accompanying drawings in which like reference characters designate like or corresponding parts throughout several views.

BRIEF DESCRIPTION OF THE DRAWINGS

FIG. 11 is a flowchart of a subroutine for performing a film-end detecting operation, to be called by another subroutine for performing a one-frame advance operation, which is called in the photographing process of FIG. 9.

DETAILED DESCRIPTION OF THE PREFERRED EMBODIMENT

Hereinafter, the preferred embodiment of the present invention will be described in detail by referring to the accompanying drawings.

Figure 1:
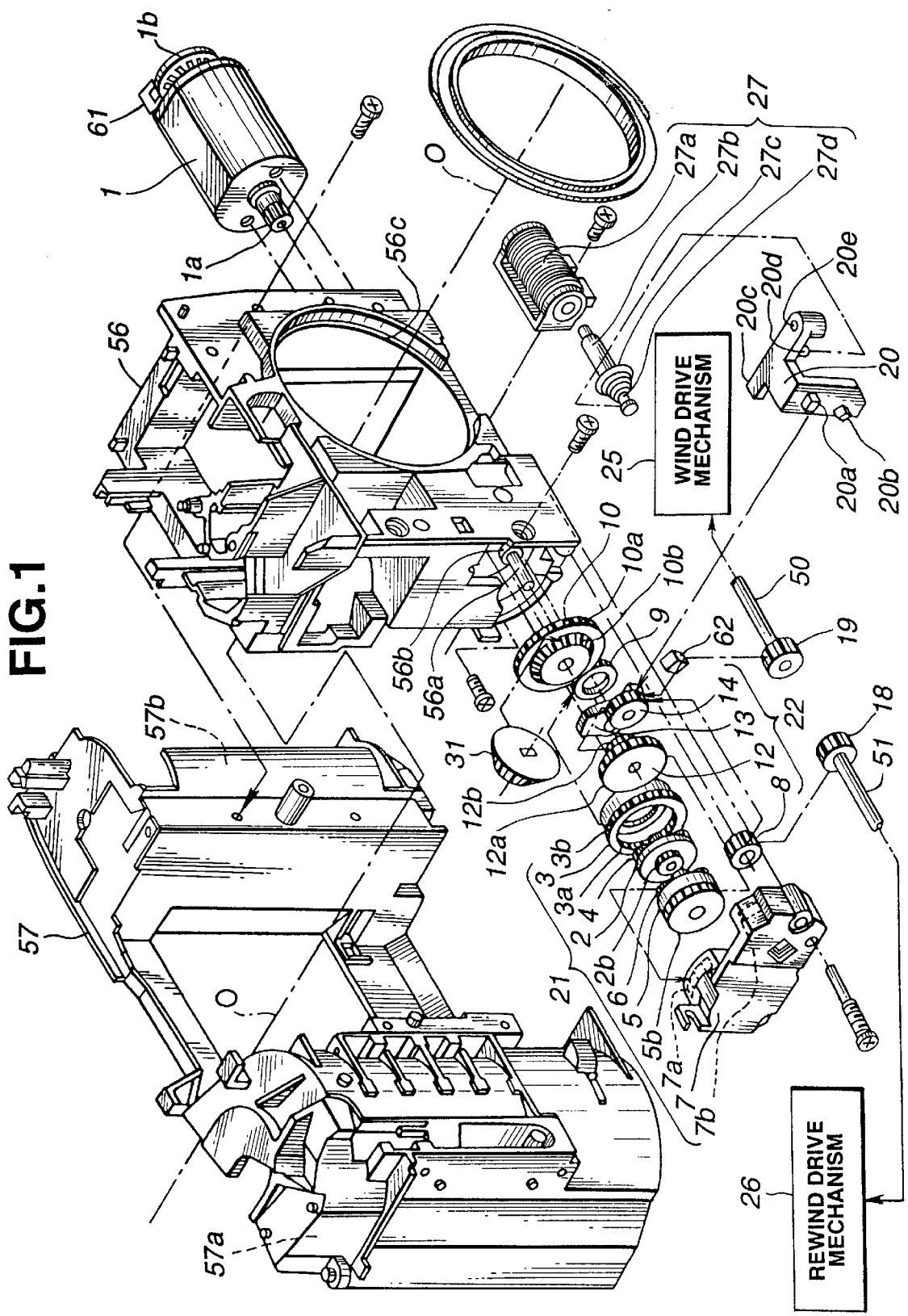
FIG. 1 is an exploded perspective view of a drive mechanism that is a drive force transmission device for a camera, which is an embodiment of the present invention.
Figure 2:
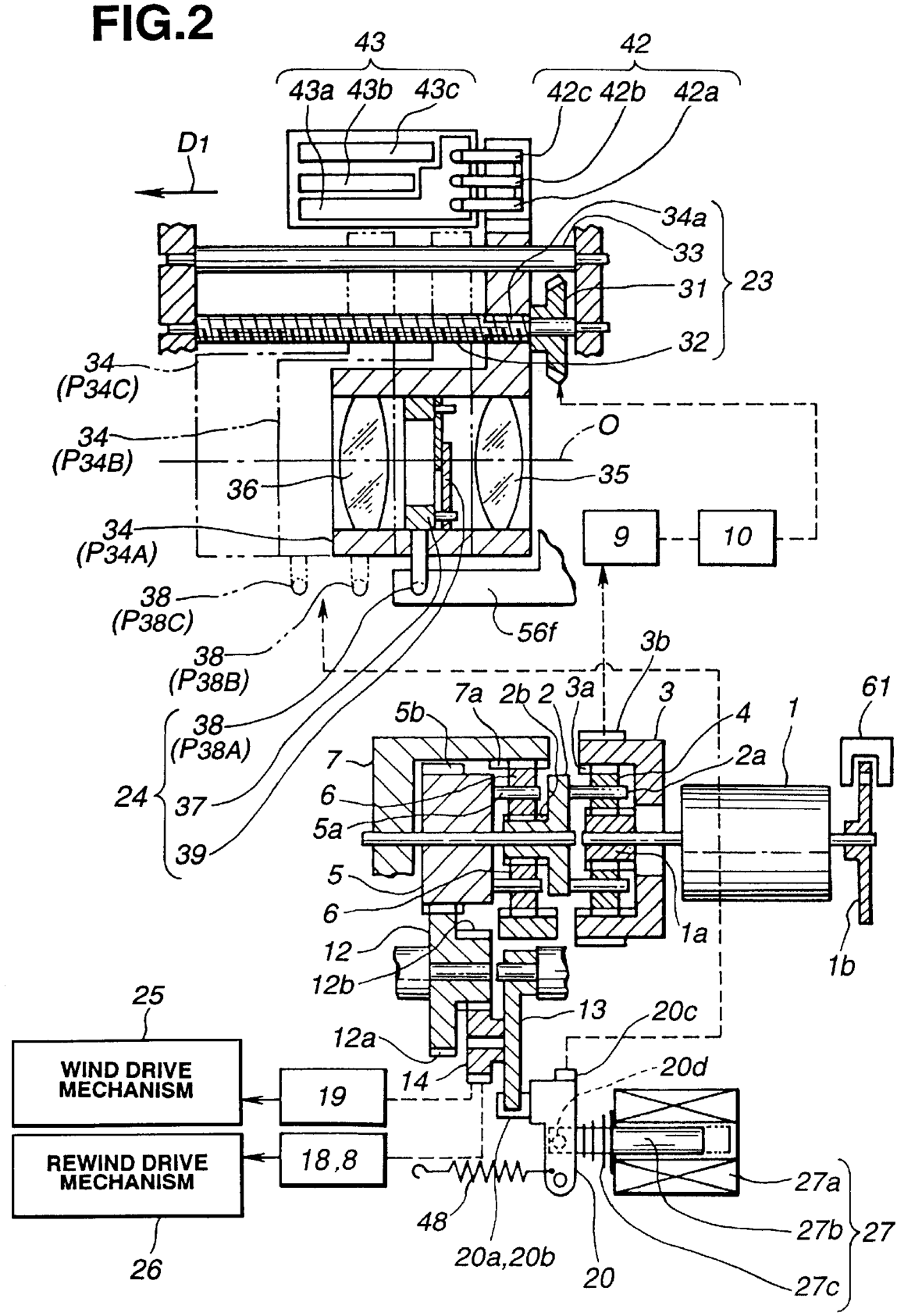
FIG. 2 is a schematic longitudinal sectional view of the drive force transmission device for a camera of FIG. 1.
Figure 3:
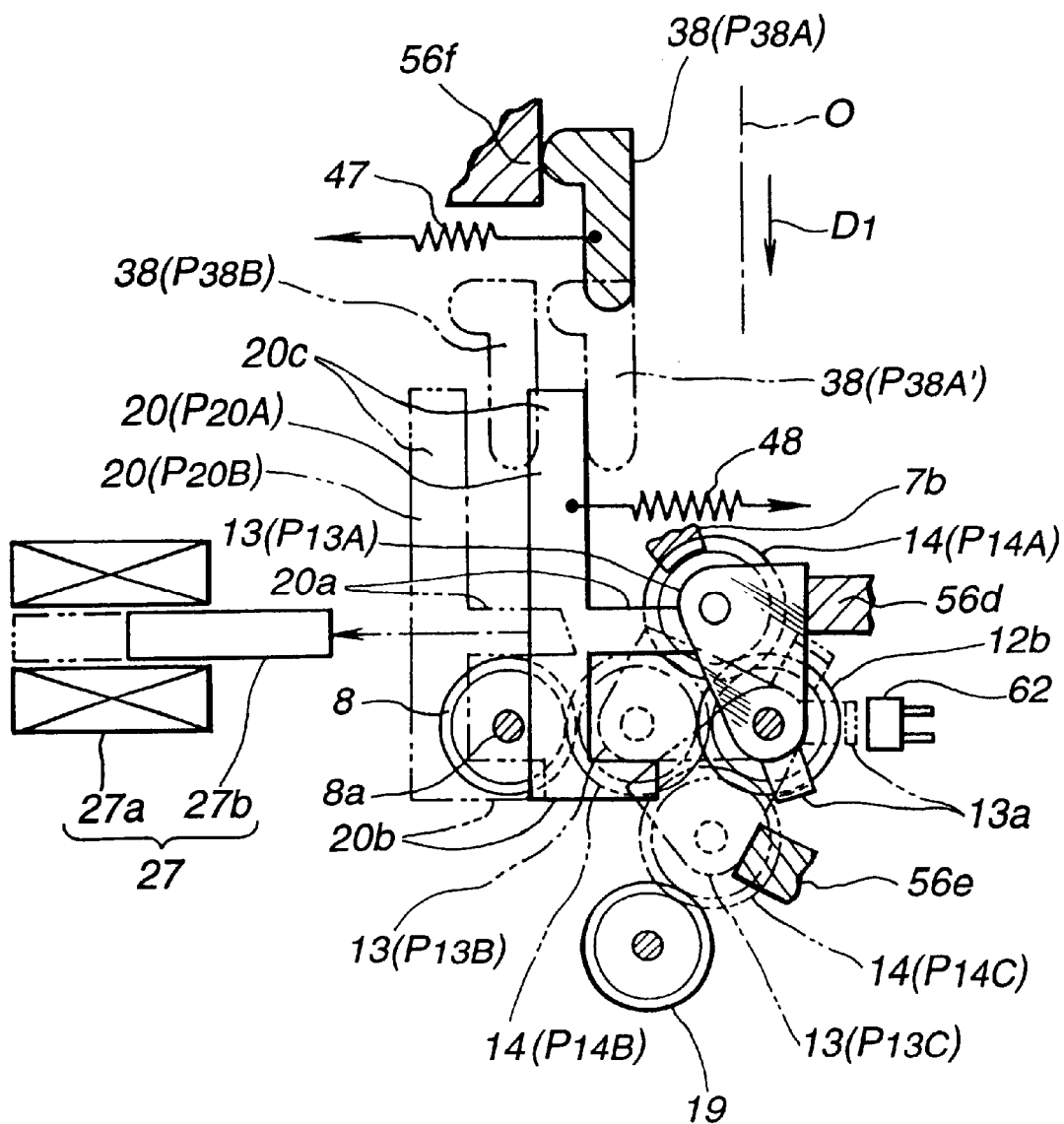
FIG. 3 is a schematic sectional view of a planetary gear mechanism of the drive mechanism of the camera of FIG. 1 and surroundings thereof.
Figure 4:
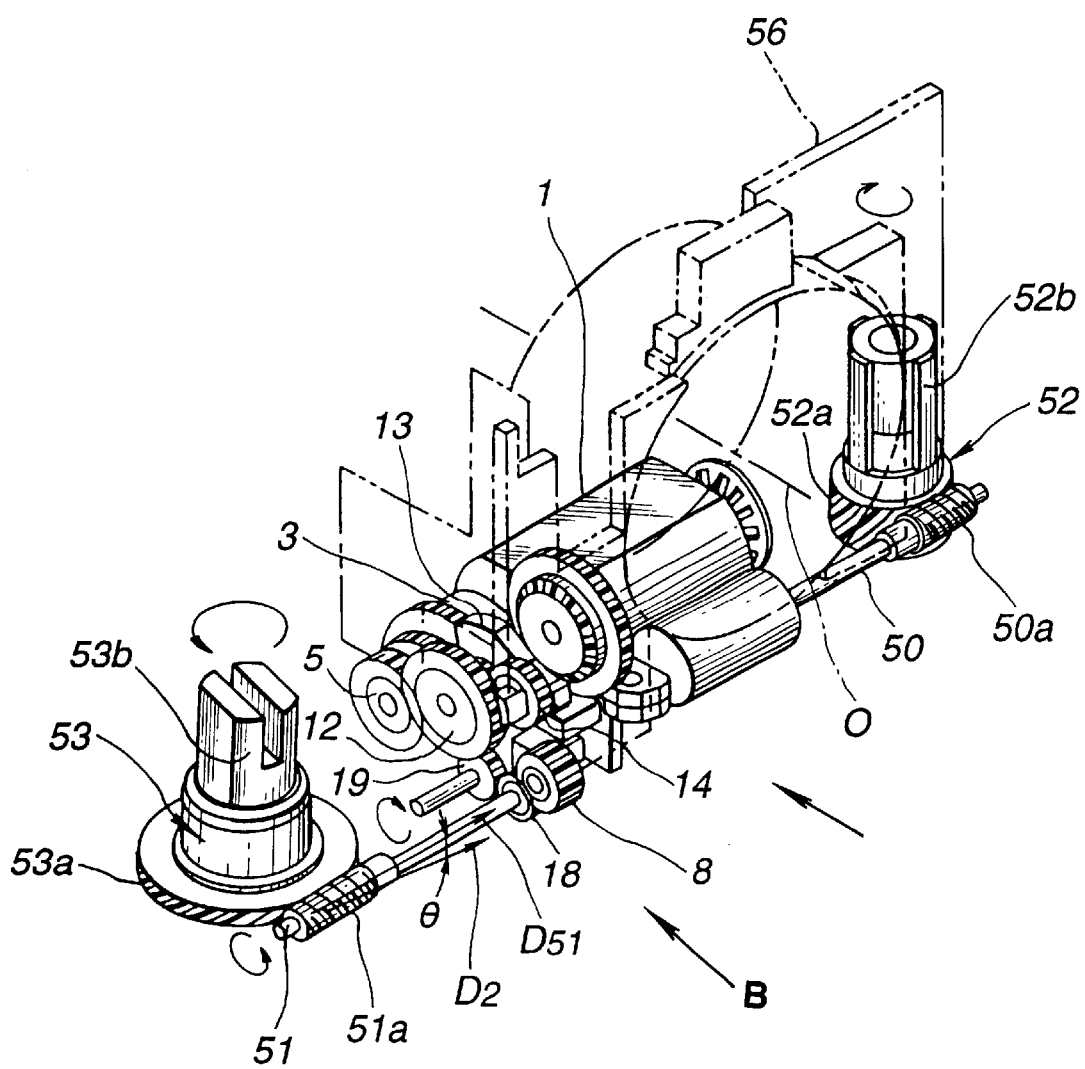
FIG. 4 is a perspective view of a differential gear mechanism and a film feeding mechanism portion of the drive mechanism of the camera of FIG. 1.
Figure 5:
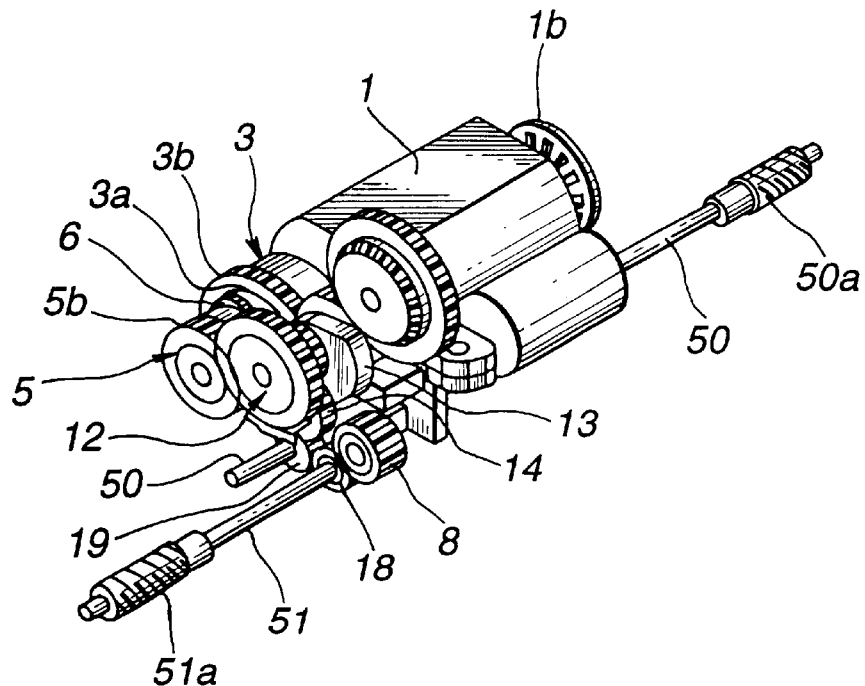
FIG. 5 is another perspective view of the differential gear mechanism and the film feeding mechanism portion of the drive mechanism of the camera of FIG. 1, which illustrates a state in which a wind drive mechanism is driven.
Figure 6:
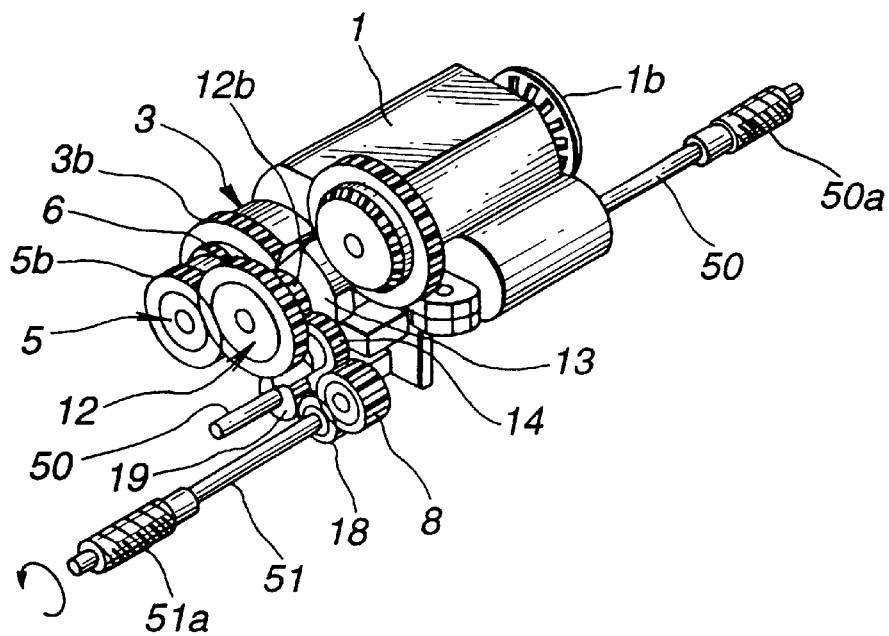
FIG. 6 is another perspective view of the differential gear mechanism and the film feeding mechanism portion of the drive mechanism of the camera of FIG. 1, which illustrates a state in which a rewind drive mechanism is driven.
Figure 7:
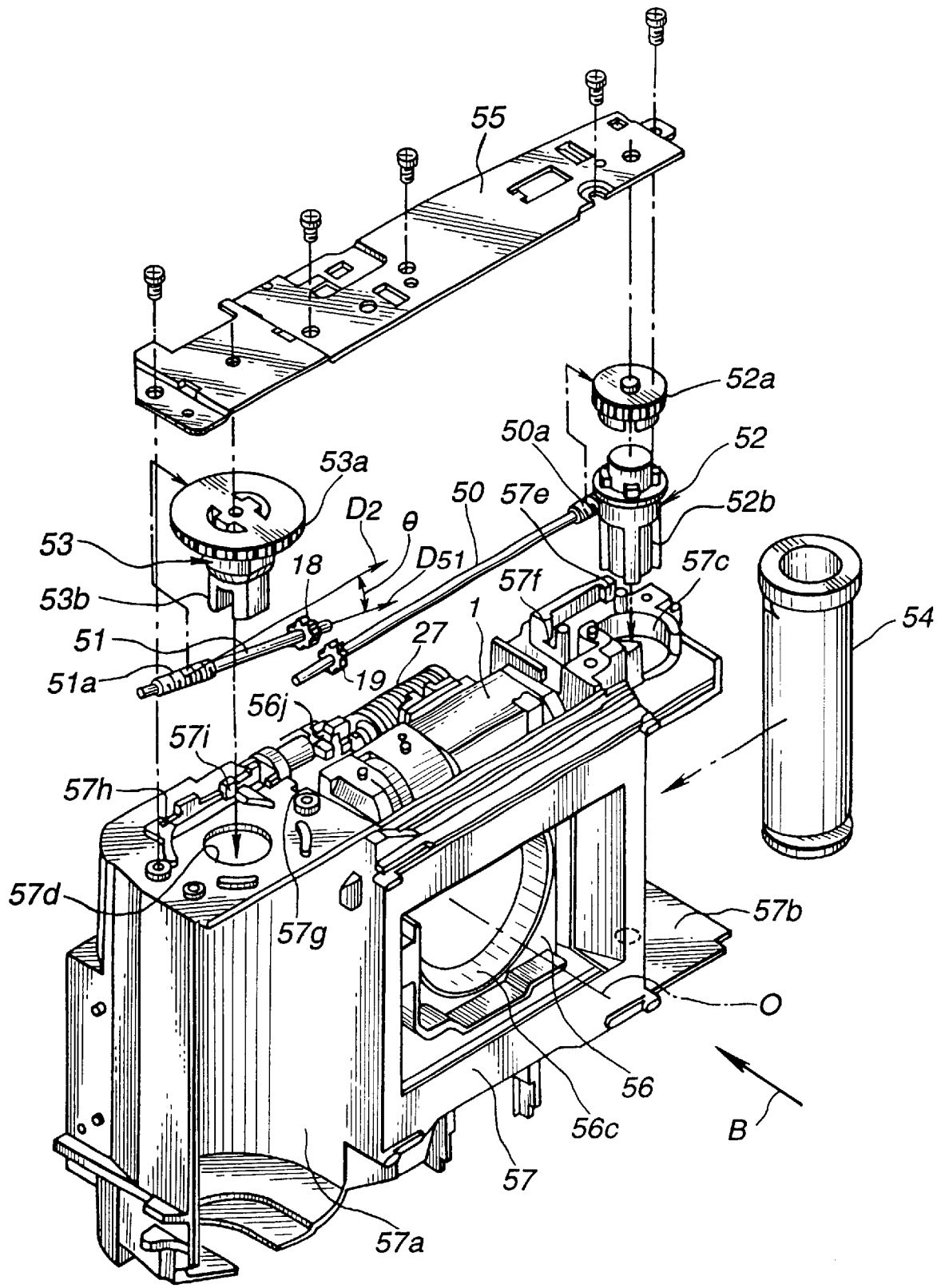
FIG. 7 is an exploded perspective view of the film feeding mechanism portion of the drive mechanism of the camera of FIG. 1, which is viewed from the bottom of the body of the camera.

FIG. 1 is an exploded perspective view of a drive mechanism that is a drive force transmission device for a camera, which is an embodiment of the present invention. FIG. 2 is a schematic longitudinal sectional view of the aforesaid drive force transmission device for a camera. FIG. 3 is a schematic sectional view of a planetary gear mechanism of the aforesaid drive mechanism of the camera and surroundings thereof, which is taken in the direction of a drive shaft thereof. Further, FIGS. 4 to 6 are perspective diagrams for illustrating working conditions of a film feeding mechanism portion and surroundings thereof. FIG. 7 is an exploded perspective view of the film feeding mechanism portion and surroundings thereof, which is taken from the bottom of the body of the camera. Incidentally, in the aforesaid FIGS. 4 to 6, the body of the camera and an end plate, which is a cover for a gear portion, are not shown for simplicity.

As illustrated in FIGS. 1 and 2, the drive mechanism of this embodiment of the present invention is provided mainly with: a motor portion containing a motor 1 which serves as a drive source; a differential gear mechanism 21, which is driven by the aforesaid motor 1 and has two output gears; and a drive mechanism 23 (see FIG. 2) for driving a drive gear train, which includes an idle gear 9 (shown in block diagram form). acting as a first driven system to be driven by one of the output gears, and for driving a lens-barrel. Further, the aforementioned drive mechanism is provided with: a film feeding mechanism consisting of a film wind drive mechanism 25 and a film rewind drive mechanism 26, which serve as a second driven system driven by the other of the output gears; a planetary gear mechanism 22 for selecting a driven system to be driven by the aforementioned differential gear mechanism 21; a shutter mechanism 24 (see FIG. 2) serving as a third driven system which is different from the first and second driven systems; and a plunger unit 27 acting as an electromagnetic drive source for switching a driven system, to which power is transmitted, and for driving the aforesaid third driven system; and a clutch lever 20 to be driven by the aforesaid plunger unit 27.

A camera incorporating the aforesaid drive mechanisms is provided with: a camera body 57 on the left and right sides of which a film cartridge chamber 57a and a spool chamber 57b are placed as viewed in FIG. 1; and a front panel or plate 56 which is mounted in the central portion of the aforesaid camera body 57 and has a lens-barrel mounting aperture portion 56c.

Further, the aforesaid film feeding mechanism portion is disposed at a lower part of the aforementioned camera body 57. Moreover, the motor 1 and the plunger unit 27 are disposed at a lower part of the front panel 56. Furthermore, a differential gear mechanism 21 and a planet gear mechanism 22 are similarly disposed at the aforesaid lower part. Additionally, a lens barrel 34 containing a built-in shutter mechanism 24, and a lens-barrel drive mechanism 23, which are mounted in the aperture portion 56c, are incorporated into the front panel 56 (see FIG. 2).

Hereinafter, the configuration of each of the aforesaid elements will be described. First, the motor 1 composing the aforementioned motor portion is a rotary drive source, and output shafts respectively project from opposite end surfaces of the motor 1. Slit disk 1b, in which holes allowing light to pass therethrough and faces being operative to cut off light are consecutively arranged along the circumference thereof, is securely fixed at an end part of one of the output shafts so as to control rotation of this motor 1. Further, a photointerrupter 61, in which a light projecting element and a light receiving element are disposed as a unit, is placed in such a manner as to sandwich this slit disk 1b. Then, the aforementioned photointerrupter 61 outputs a pulse signal corresponding to an angle of rotation of the motor.

Moreover, a pinion 1a is fixedly mounted at the other output shaft end of the motor 1. This pinion 1a engages with a plurality of planetary gears 4, for example, three planetary gears 4 of the differential gear mechanism 21 (to be described later).

The aforesaid differential gear mechanism 21 is composed of: carriers 2 and 5, which have three planetary gears 4 and 6 as two-stage planetary gear mechanisms, respectively; a gear 3 consisting of an internal gear portion 3a and an external gear portion 3b; and an end plate 7 which is fixed to the front panel 56 and contains an internal gear 7a and an internal sector gear 7b and is used as a cover for the aforementioned gear mechanism as illustrated mainly in FIGS. 1 and 2.

The aforesaid planetary gears 4 are rotatably supported by a plurality of shafts 2a in the carrier 2 having a rotating gear 2b, respectively, and can rotate around each of such shafts 2a. Moreover, the aforesaid planetary gear 4 further engages with the internal gear portion 3a of the rotatable gear 3. External gear portion 3b of this gear 3 is coupled to a bevel gear 31 for driving the lens-barrel drive mechanism 23 (to be described later) through a gear train composed of an idle gear 9, a spur gear 10a and a bevel gear 10b of the gear 10.

Incidentally, the aforesaid idle gear 9 is supported by a shaft portion 56b of the camera front panel 56. Further, the aforesaid gear 10 is supported on a shaft 56a which is eccentric to the shaft portion 56b. The aforesaid gear 2b of the carrier 2 further engages with the three planetary gears 6 of the carrier 5. These planetary gears 6 are supported on a shaft 5a for rotation, which is provided in the carrier 5 that is similar to the carrier 2. These planetary gears 6 respectively engage with an internal gear 7a provided in the end plate 7 that is fixed in the camera body. The aforesaid carrier 5 further has a gear portion 5b acting as an output gear. The gear portion 5b engages with a gear portion 12a of a gear 12 (to be described later) through a gear train (not shown) and drives the planetary gear mechanism 22.

It is assumed that the shaft center of the pinion 1a, the gear 3, the carriers 2 and 5 and the internal gear 7a of the aforementioned motor 1 is placed on the output shaft of the motor 1. Further, an output of the motor 1 is switched between outputs respectively corresponding to two drive systems by using a clutch lever 20 and the aforesaid differential gear mechanism 21. One of the outputs respectively corresponding to the two drive mechanisms is a drive output to be used by the lens-barrel drive mechanism 23 for driving the lens barrel in such a manner as to advance and retreat, while the other of the outputs respectively corresponding to the two drive mechanisms is a drive output to be used for driving the planetary gear 14 of the planetary gear mechanism 22 and thus to be used by the film feeding mechanism (to be described later).

The aforesaid lens-barrel driving mechanism 23 is operative to drive the lens barrel 34, which holds photographing lens groups 35 and 36, to advance along the optical axis 0 from a collapsing position P34A, which is located in a non-photographing area, to a photographable position P34B, which is located in a photographing area, as illustrated in FIG. 2. Moreover, the lens-barrel drive mechanism 23 drives the lens barrel to advance and retreat between the photographable positions P34B and P34C, which are located in the photographing area, with the intention of adjusting the focus of a lens.

The aforesaid lens-barrel drive mechanism 23 is composed mainly of: a bevel gear 31 engaging with the bevel gear 10a of the aforesaid gear 10; a screw shaft 32 for causing the lens barrel 34 of the camera to advance and retreat along the optical axis 0 of the photographing lens; a guide shaft 33 which is slidably fitted into the lens barrel 34; a female screw 34a of the lens barrel 34, which is screwed into the aforesaid screw shaft 32; and an encoder portion for detecting the advanced and retreated positions of the lens barrel.

Incidentally, the aforementioned bevel gear 31 is fixed to the aforesaid screw 32 in such a manner as to be integral therewith. The guide shaft 33 is placed in parallel with the screw shaft 32 which is slidably fitted into the lens barrel 34.

Further, the lens barrel 34 holds the photographing lens groups 35 and 36 and contains the shutter mechanism 24, as illustrated in FIG. 2.

The aforesaid shutter mechanism 24 consists of: what is called an arrow wheel 37 serving as a drive member which is rotatable mainly about the lens barrel; a sector 39 for opening and closing a shutter (namely, performing exposure and shading) as the aforesaid arrow wheel rotates clockwise or counterclockwise; and a spring 47 for pushing the sector 37 in an opening direction.

Incidentally, the aforesaid arrow wheel 37 has a rotation operation portion 38 whose edge portion can move from a shutter closing position P38A or P38A' to a shutter opening position P38B by rotating.

The aforesaid arrow wheel 37 moves by advancing and retreating together with the lens barrel 34. When the lens barrel 34 is located at the collapsed position P34A as shown in FIG. 3, a camera-front-panel-side stopper portion 56f acting as a limiting portion for holding the rotation operation portion 38 of the aforesaid arrow wheel 37 at the shutter closing position P38A is provided on a camera side. When the lens barrel 34 is advanced to a place between the photographable positions P34B and P34C on the photographing area, the rotation operation portion 38 of the arrow wheel 37 moves to the position P38A' whereupon the portion 38 is put into a ready-for-release state and is further put into a rotatable state in which the portion 38 can move to the shutter opening position P38B.

The aforesaid encoder portion is an encoder for detecting the position of the lens barrel 34 itself. The encoder portion has an encoder circuit board 43, which is provided with encoding patterns 43a, 43b and 43c, and a sliding armature group 42 (constituted by a same conductive member), which can make contact with the aforementioned patterns.

The aforesaid armature group 42 consists of three armatures as shown in FIG. 2. First armature 42a thereof is always electrically in contact with the common pattern 43a. When performing the focusing of the lens barrel 34, the second armature 42b makes contact with the count starting position detection pattern 43b under sliding conditions so as to judge the advanced position of the lens. The count starting point, at which the counting of output pulse signals of the photointerrupter 61 is started, is detected according to the detection pattern 43b.

Further, the third armature 42c makes contact with the collapsing detection pattern 43c to be used for judging whether or not the lens barrel 34 is at a collapsed position with respect to the camera. Incidentally, an actual detection point detected according to the aforesaid second armature 42b is a point at which a patterns to be used is changed between the patterns 43a and 43b. Moreover, an actual detection point detected according to the aforesaid second armature 42c is a point at which a patterns to be used is changed between the patterns 43a and 43c.

The aforesaid planetary gear mechanism 22 is composed of: the gear portion 12a engaging the gear portion 5b of the carrier 5; a planetary gear arm 13; and a planetary gear 14 engaging a sun gear portion 12b. Incidentally, the planetary gear arm 13 is rotatably supported on the shaft of the aforesaid gear 12. Further, the planetary gear 14 is rotatably supported on the shaft that is provided on the aforesaid planetary gear arm 13.

Therefore, the aforesaid planetary gear 14 can rotate on the axis thereof and move around the shaft of the gear 12. The fixing internal sector gear 7b provided in the end plate 7, which is fixed to the camera body, and the spur gear 8 supported on the supporting shaft 8a as a selected engaging gear for a film rewinding drive operation (to be described later) and the gear 19 supported on a winding shaft 50 as a selected engaging gear for winding film (to be described later) are disposed on the locus of the revolution of the planetary gear 14 around the shaft of the gear 12.

Further, the planetary gear 14 can be engaged with the aforesaid gears 7b, 8 and 19 by causing the planetary gear arm 13 to stop at rotation positions P13A, P13B and P13C, respectively. The selection of the rotation position, at which the planetary gear arm 13 is stopped, thereamong is performed by the movement of the clutch lever 20 to be controlled by the plunger unit 27 (to be described later).

Incidentally, a reflecting plate 13a for reflecting light is provided at an edge portion that is opposite to the side on which the planetary gear 14 of the planetary gear arm 13 is located. Further, a photoreflector for a clutch 62 is placed at a position where the aforesaid planetary gear 14 engages with the spur gear 8 (to be described later), and where the photoreflector faces the aforesaid reflecting plate 13a.

As shown in FIGS. 1 to 3, the aforesaid plunger unit 27 is composed of: the solenoid 27a; a moving core 27b which can be withdrawn or projected by turning on or off the aforementioned solenoid 27a; and a return spring 27c pushing the aforesaid core 27b in a projecting direction in which the core 27b is projected.

The aforesaid clutch lever 20 is illustrated in FIG. 3 as being in a parallel displacement state. However, the clutch lever 20 is supported on the camera body in such a manner as to be able to rotate in the supporting shaft hole 20e. The position of the planetary gear arm 13 is controlled by the rotation of the clutch lever 20.

Moreover, the clutch lever 20 is provided with arm portions 20a and 20b, which goes into and out from the displacement plane of the planetary gear arm 13 in a direction perpendicular thereto, as shown in FIG. 1.

Furthermore, an arm portion 20c, which goes into and out from the arrow-wheel rotation operation portion 38 at an engaging position and at a disengaging position, is provided in the aforesaid clutch lever 20. Additionally, a connecting pin 20d, which is adapted to engage with a groove 27d bored in the core 27b of the plunger unit 27, is provided in the aforesaid clutch lever 20. The position of the clutch lever 20 is controlled by the aforesaid plunger unit 27.

Namely, in a state in which the solenoid 27a of the plunger unit 27 is turned off (i.e. deenergized), the aforesaid core 27b is protruded from solenoid 27a, as shown in FIG. 3. Further, the clutch lever 20 is at an engaging position P20A, and holds the planetary gear arm 13 by the arm portion 20a thereof. Moreover, the planetary gear arm 13 is held by the arm portion 20b of the clutch lever 20 at the position P13B.

Furthermore, when the lens barrel 34 is at the photographable position P34B or P34C (see FIG.2) and the clutch lever 20 is at the engaging position P20A, the arrow wheel rotation operation portion 38 for opening and closing the shutter is held at the shutter closing position P38A'.

Further, when the solenoid 27a is turned on (i.e. energized) and the aforesaid core 27b is attracted thereto and the clutch lever 20 retreats to an evacuation position, the aforesaid planetary gear arm 13 is able to perform a rotating operation. Moreover, the arm portion 20c retreats. Thus, if the rotation operation portion 38 for performing the rotation operation of the arrow wheel 37 for opening and closing the shutter is at the position P38A', the portion 38 moves to the shutter opening position P38B. Consequently, an exposure operation is performed.

Incidentally, the aforesaid clutch lever 20 is pushed in a direction in which the shutter mechanism 24 is closed by a closing spring 48 serving as a pushing means and in which the core 27b is protruded. Further, although the closing spring 48 and the return spring 27c are different from each other only in an embodying manner, these springs have a similar function.

The aforesaid film wind drive mechanism 25 is composed of the winding shaft 50, which acts as a drive shaft, and a spool shaft 52, as illustrated in perspective diagrams of FIGS. 4 to 6 or an exploded perspective diagram of FIG. 7.

Incidentally, the gear 19, with which the aforementioned planetary gear mechanism 22 and the planetary gear 14 can engage, and the screw gear (or worm gear) 50a are rigidly fixed to the aforesaid winding shaft 50. Further, the aforesaid spool shaft 52 has a driven bevel gear 52a, which engages with the aforesaid screw gear 50a, and a fitting portion fitted into a spool cylinder (namely, a take-up spool) 54 (see FIG. 7) for winding film. Moreover, the aforesaid spool shaft 52 is rotatably supported in the supporting shaft hole 57c of the camera body 57 and is operative to support the spool cylinder 54.

Screw gear 50a is made of or metal or plastic. In the case that the screw gear 50a is made of metal, it is preferable that an easy-to-process material, such as a brass and a soft steel, is used and processed by cutting and working and that the surface of the screw gear is plated, for instance, nickel-plated by using a lubricative surface modifier such as Teflon (incidentally, "Teflon" is a registered trade mark). In the case that the screw gear 50a is made of plastic, it is preferable to use a resin made of a crystal of, for example, a polyacetal resin.

Under the load of the bevel gear 52a, the shaft of the screw gear 50a bends away therefrom and undergoes a force in a direction in which the engagement between the gears is reduced. When the shaft bends in this manner, there are fears of a reduction in efficiency, an occurrence of abnormal sound and a shortage of gear strength.

However, the aforementioned reduction in performance can be prevented by employing the metallic screw gear 50a, without upsizing the device. In the case that the screw gear 50a is made of plastic, the winding shaft 50 is made of metal. Moreover, this shaft is fitted into and fixed to the screw gear 50a. Thus, advantageous effects similar to those described above can be obtained.

Similarly as in the case of the aforesaid screw gear 50a, the bevel gear 52a is made of metal or plastic. In this case, it is preferable that the screw gear and the bevel gear 53a are different in material from each other, because neither abrasion due to a bite by teeth of the gear nor degradation in transmission efficiency are caused.

Thus, for the aforementioned reasons, it is preferable for obtaining a drive force transmission device, which has sufficient performance in spite of a small size thereof, to employ the screw gear 50a made of metal and the bevel gear 52a made of plastic.

The aforesaid film rewind drive mechanism 26 is composed of the rewinding shaft 51, which acts as a drive shaft, and a fork shaft 53, similarly as illustrated in the perspective diagrams of FIGS. 4 to 6 or the exploded perspective diagram of FIG. 7.

Incidentally, the spur gear 18 engaging the spur gear 8, with which the aforementioned planetary gear mechanism 22 and the planetary gear 14 can engage, and the screw gear (or worm gear) 51a are securely fixed to the aforesaid rewinding shaft 50. Further, the aforesaid fork shaft 53 has a driven bevel gear 53a, which engages with the aforesaid screw gear 51a, and a fork portion 53b fitted into a spool of a film cartridge. Moreover, the aforesaid fork shaft 53 is rotatably supported in the supporting shaft hole 57d of the camera body 57 and is disposed on a cartridge chamber 57a.

Even in the case of the rewind drive mechanism, it is preferable to employ the screw gear 51a made of metal and the bevel gear 53a made of plastic, similarly as in the case of the aforesaid wind drive mechanism.

Further, as shown in the exploded perspective diagram of FIG. 7, which illustrates the camera body 57 and is taken from below, the wind shaft 50 is fitted into shaft fitting portions 57e, 57f and 57g, which are provided under the film cartridge chamber 57a and the spool chamber 57b. Incidentally, a coating of grease is applied to the engaging surfaces of the aforesaid shaft fitting portions 57e, 57f and 57g, the screw gear 50a and the bevel gear 52a.

Furthermore, as illustrated in the aforementioned exploded perspective diagram of FIG. 7, the rewind shaft 51 is fitted into the shaft fitting portions 57h and 57i, which are provided under the film cartridge chamber 57a, and the shaft fitting portion 56j of the front panel 56. Incidentally, a coating of grease is applied to the engaging surfaces of the aforesaid shaft fitting portions 57h, 57i and 56j, the screw gear 51a and the bevel gear 53a.

The aforesaid wind shaft 50 and the aforementioned rewind shaft 51, which are fitted into a set of the shaft fitting portions 57e, 57f and 57g and another set of the shaft fitting portions 57h, 57i and 56j, respectively, are pressed by a metallic pressing plate 55 mounted on the camera body 57 by screwing, and thus are rotatably supported on the camera body 57 or the front panel 56. Simultaneously, the aforesaid fork shaft 53 and the aforementioned spool shaft 52 are rotatably supported on the camera body 57 during the time shafts 52 and 53 are pressed by the aforesaid pressing plate 55.

The aforesaid shafts 50 and 51 are put into a three-point suspension state in the aforementioned shaft fitting portions, respectively. Thus, each of the aforesaid shafts 50 and 51 is supported in a state in which a slight clearance of small dimensions is present in the central shaft fitting portion of the corresponding set.

Incidentally, the aforesaid rewinding shaft 51 is attached to the camera body 57, as above described and as illustrated in the perspective diagram of FIG. 4 or in the exploded perspective diagram of FIG. 7. The rewinding shaft 51 is mounted therein in such a manner that the direction D51 thereof is inclined to a direction D2, which is parallel with the direction of the shaft of the motor 1, so that an edge thereof, which is provided on the side of the spur gear 18, is inclined upwardly as viewed in FIG. 4 (namely, downwardly as viewed in FIG. 7 which is a perspective diagram taken from below). Namely, the rewinding shaft 51 is mounted therein in such a manner as to be inclined to the center of the camera body so that an angle θ of inclination is 2° or so. Additionally, the direction of the shaft of the motor 1 is set to be a horizontal direction which is orthogonal to the optical axis O.

When mounting the rewinding shaft 51 therein in such a manner as to be inclined in spite of the fact that the supporting shaft 8a of the spur gear 8 serving as a selected engaging gear with which the spur gear 18 to be fixed to the rewinding shaft 51 engages, the rewinding shaft 51 can be mounted therein without problems by providing a backlash so that no interference is caused in the closest region between the spur gears 18 and 8. Consequently, the aforesaid gear can be engaged therewith.

Incidentally, the engagement between the bevel gear 53a of the fork shaft 53 and the screw gear 51a causes no problems, because this is the engagement thereof with a screw gear.

By mounting the rewinding shaft 51 therein in such a manner that an edge thereof provided on the side of the spur gear 18 is inclined upwardly as above described, the shaft end portion and a part of the spur gear 18 can extend into the inside of the camera front panel 56. Consequently, the space can be effectively utilized.

FIG. 5 illustrates a state of a film winding operation in which the winding shaft 50 is driven. In this winding state, the screw gear 50a having a right-hand thread is rotated clockwise as viewed in FIG. 4, as will be described later. Thus the bevel gear 52a engaging with this screw gear 50a is rotated clockwise as viewed in FIG. 4, so that the film is wound up. At that time, the winding shaft 50 is moved rightwardly by a thrust of the screw gear, as viewed in FIG. 4. Upper right end portion of the winding shaft 50, which is illustrated in an upper right portion in FIG. 4, is shaped like a hemi-sphere and abuts against a leading-edge portion (not shown) of the pressing plate. A coating of grease is applied to this abutting portion to be abutted.

During the aforesaid winding operation, the fork shaft 53 of the cartridge chamber undergoes clockwise torque. This torque causes the rewinding shaft 51 to move leftwardly and downwardly as viewed in FIG. 4. Lower left end portion of the rewinding shaft 51, which is illustrated in FIG. 4, is shaped like a hemi-sphere and abuts against an edge part of the fitting portion 57h of the camera body 57. A coating of grease is applied to this abutting part to be abutted.

In the case of this film drive mechanism, the bevel gear 53a of the fork shaft 53 and the screw gear 51a of the rewinding shaft 51 have simpler structures and remain engaged. However, it is generally difficult to rotate the screw gear 51a of the rewinding shaft, whose helix angle is large, by the bevel gear 53a.

Thus, in the case of the film drive mechanism of this embodiment, the axial abutting portion of the rewinding shaft 51 is shaped like a hemi-sphere, as described above. Further, this abutting portion is caused to make point-contact at the center of rotation. Consequently, a rotational load is reduced. Further, the screw gear 51a, which remains engaged, can be rotated smoothly by employing the specifications of the gear, by which the helix angle of the screw gear is set as being not more than 70° as described in TABLE 1 listed below. Incidentally, the transmission efficiency of the screw gear has a maximum value in the vicinity of a helix angle of 60°. Therefore, it is preferable that the helix angle is set at a value which is not more than 70° but is in the proximity of 60°.

The perspective diagram of FIG. 6 illustrates a state of a film rewinding operation in which the rewinding shaft 51 is driven. During the rewinding operation, the spool shaft 52 of the spool chamber undergoes counterclockwise torque. Similarly as in the case of the screw gear 51a, it is difficult to rotate the screw gear 50a of the rewinding shaft, whose helix angle is large, by the bevel gear 52a. Thus, in the case of the film drive mechanism of this embodiment, the rewinding shaft 51 has a structure similar to that of the aforesaid winding shaft 50. Moreover, the specifications of the gear described in TABLE 2 listed below are employed. Consequently, the screw gear 50a, which remains engaged, can be rotated smoothly.

TABLE 1

|  | Screw Gear 51a | Bevel Gear 53a |
| --- | --- | --- |
| Classification Tooth | Pinion | Gear |
| Tooth Form | Full Depth Tooth | |
| Module | 0.3 | |
| Pressure Angle | 20° | |
| Number of Teeth | 2 | 43 |
| Shaft Angle | 87.71° | |
| Helix Angle | 65° | 22.71° |
| Helix Direction | Right-Hand | |
| Reference Pitch Diameter | φ1.42 | φ13.98 |
| Normal Addendum Modification Coefficient | +0.4 | −0.25 |
| Amount of Addendum Modification | +0.12 | −0.75 |
| Center Distance | 7.9 mm | |

TABLE 2

|  | Screw Gear 51a | Bevel Gear 53a |
| --- | --- | --- |
| Classification Tooth | Pinion | Gear |
| Tooth Form | Full Depth Tooth | |
| Module | 0.3 | |
| Pressure Angle | 20° | |
| Number of Teeth | 2 | 24 |
| Shaft Angle | 90° | |
| Helix Angle | 66° | 24° |
| Helix Direction | Right-Hand | |
| Reference Pitch Diameter | φ1.475 | φ7.881 |
| Normal Addendum Modification Coefficient | +0.5 | +0.2 |
| Amount of Addendum Modification | +0.15 | +0.06 |
| Center Distance | 4.9 mm | |

In the case that power transmission is performed by arranging spur gears similarly as in the case of the conventional device, the transmission efficiency is degraded when the number of the spur gears is increased. Therefore, it is necessary to decrease the number of the gears as much as possible. To that end, the diameter of the gear should be increased. Thus, a large space is required to dispose a plurality of power transmission systems in the device. Consequently, the downsizing of a camera is hindered.

On the other hand, in the case of the film drive unit which is a drive force transmission device according to this embodiment, a plurality of power transmission systems between the winding shaft 50 and the rewinding shaft 51 are disposed in the bottom portion of the camera in such a manner as to be nearly parallel with one another, as illustrated in the perspective diagrams of FIGS. 4 to 6 and the exploded perspective diagram of FIG. 7. Therefore, differently from the case of performing power transmission by arranging spur gears, neither the cost of the device is increased, nor the efficiency thereof is degraded in the case that the power transmission is performed by using the drive shafts such as the winding shaft and the rewinding shaft. This is because the number of members is not increased regardless of the distance, for which power should be transmitted, in the latter case. Additionally, a plurality of power transmission systems can be disposed in a small space.

Next, each operation of the drive force transmission mechanism of this embodiment having the aforementioned configuration will be described hereinbelow by first beginning with the description of advancing and retreating operations of the lens barrel.

When the sun gear portion 12b of the aforesaid gear 12 is rotated clockwise as viewed in FIG. 3 by driving the motor 1, the planetary gear 13 rotates and abuts against the camera-front-panel-side stopper 56d. At that time, the planetary gear 14 reaches the position P14A where the planetary gear 14 engages with the internal sector gear 7b provided in the stationary end plate 7 of the camera body. Then, the planetary gear 14 is put into a state in which the rotation thereof is stopped. When the planetary gear 14 is in this state, the clutch lever 20 is moved to the engaging position P20A (see FIG. 3). Subsequently, when the pinion 1a of the motor 1 is rotated counterclockwise, the planetary gear 14 tries to move counterclockwise around the shaft of the gear 12, as viewed in FIG. 3. However, the arm portion 20a of the clutch lever 20 is present on the locus of this movement or revolution of the planetary gear 14 and abuts against the planetary gear arm 13. Consequently, this arm portion 20a hinders the counterclockwise revolution of the planetary gear 14.

Further, when the motor 1 is driven clockwise or counterclockwise as viewed in FIG. 1 when the planetary gear 14 is in the aforementioned state, the rotation of the carrier 5, the rotation of the planetary gear 6 around the axis of rotation thereof itself, the revolution of the planetary gear 6 around the shaft of the gear 2b and the rotation of the carrier 2 cannot be achieved, because the gear 12 cannot rotate at that time. As a consequence, the rotation of the pinion 1a of the motor 1 is transmitted to the gear 3 through the planetary gear 4. The motor 1 can rotate in both directions, namely, can rotate clockwise and counterclockwise. Thus, similarly, the bevel gear 31 secured to the screw shaft 32 can rotate in both directions. Moreover, the lens barrel 34 can be caused to advance and retreat in the direction of the optical axis. Thus, when being in the state illustrated in FIG. 3, only the lens barrel 34 can be driven.

Next, operations of opening and closing the shutter in the lens barrel will be described hereinafter.

When the lens barrel 34 is located at the collapsing position P34A, the rotation of the rotation operation portion 38 for the arrow wheel 37 is restricted by the camera-front-panel-side stopper portion 56f as shown in FIG. 3, and the rotation operation portion 38 maintains a shutter closing state. At that time, the clutch lever 20 is in the engaging position P20A.

Then, the motor 1 is rotated clockwise when the rotation of the aforesaid planetary gear 14 illustrated in FIG. 3 is locked. Subsequently, the lens barrel 34 moves in the direction of the arrow D1 of FIGS. 2 and 3. The rotation operation portion 38 for the arrow wheel 37 moves in the same direction D1 in such a manner as to be integral therewith. Then, the rotation operation portion 38 is released from the stopper 56f. Further, the rotation operation portion 38 is pushed leftwardly, as viewed in FIG. 3, namely, in a shutter opening direction at all times by the spring 47 for providing a drive force used to drive the shutter. However, because the clutch lever 20 is in the engaging position P20A, a pushing force of the closing spring 48, which is stronger than that of the aforesaid spring 47, acts on the shutter through the side surface of the arm portion 20c. Thus, the shutter closing state is maintained. This state is also a shutter open ready state in which an exposure is started immediately if the clutch lever 20 retreats.

When the solenoid 27a is energized during this shutter open ready state, the clutch lever 20 retreats to the evacuation position P20B. Thus, the rotation operation portion 38 is released from the abutting state and is then moved by the force of the spring 47 to the position P38B. This movement of the rotation operation portion 38 causes the arrow wheel 37 to rotate in a shutter opening direction. Then, the sector 39 is put into an open state, and thus an exposure operation is performed. Incidentally, it is sufficient for thereafter putting the shutter into a closed state to deenergize the solenoid 27a. In response to the deenergization of the solenoid 27a, the clutch lever 20 is returned again to the engaging position P20A by the pushing force of the spring 27c or 48. Further, the rotation operation portion 38 is pressed by the arm portion 20c, so that the arrow wheel 37 is rotated in the shutter closing direction and thus the shutter is returned to the closed state.

Next, a film feeding drive operation will be described hereinbelow.

When the motor 1 is driven in such a way as to cause the gear 12 to rotate counterclockwise from the condition or position thereof illustrated in FIG. 3, the clutch lever 20 is urged to the right as viewed in FIG. 3 by the force of the closing spring 48 at all times. Thus, the planetary gear 14 cannot perform the revolution around the shaft of the gear 12. Namely, the planetary gear 14 remains engaged with the internal gear 7b of the end plate 7. Incidentally, referring to FIG. 4, there is shown a perspective view of the differential gear mechanism and the film feeding mechanism, which are in the aforesaid state illustrated in FIG. 3.

The moving core 27b of the plunger unit 27 is coupled to the aforesaid clutch lever 20. When feeding electric current through the solenoid 27a, the moving core 27b is attracted thereto. Further, the clutch lever 20 moves from the engaging position P20A to the evacuation position P20B.

When the clutch lever 20 moves to the evacuation position P20B and retreats from the position on the locus of the revolution of the planetary gear 14, the planetary gear arm 13 is put into a state in which the planetary arm 13 is not interfered by the arm portions 20a and 20b of the clutch lever 20. Subsequently, the sun gear portion 12b of the gear 12 is rotated counterclockwise, as viewed in FIG. 3, during energizing of the solenoid 27a. Then, the planetary gear arm 13 turns to the position P13C at which the planetary arm 13 abuts against the camera-front-panel-side stopper 56e. Thus, the planetary gear 14 engages with the gear 19. This gear 19 fixed to the winding shaft 50 of the film wind drive mechanism 25. Incidentally, FIG. 5 shows a perspective view of the differential gear mechanism and the film feeding mechanism while the aforesaid planetary gear 14 engages with the gear 19 of the winding shaft 50.

If the sun gear portion 12b keeps rotating counterclockwise during when aforesaid planetary gear arm 13 is in the aforementioned position P13C, the gear 19 continues rotating anticlockwise. Further, the bevel gear 52a is driven through the screw gear 50a of the winding shaft 50, so that the spool shaft 52 is rotated. Thus, the operation of winding the film is performed.

During the winding operation, torque is acted upon the fork shaft 53 of the cartridge chamber through the film. As above described, the screw gear 51a having been engaged with the bevel gear 53a is driven smoothly by the aforesaid bevel gear 53a, so that the winding of the film is performed without a hitch.

Further, it is necessary for rewinding the film to release the aforesaid gear 14, which has been caught by the arm portion 20a of the clutch lever 20, from the engagement between the gear 14 and the portion 20a and then engage the gear 14 with the spur gear 8.

Then, the moving core 27b is attracted by once energizing the solenoid 27a so as to engage the gear 14 with the bevel gear 8. Subsequently, the sun gear portion 12b of the gear 12 is rotated counterclockwise as viewed in FIG. 3 during which time the clutch lever 20 is retreated from the locus of the gear 14. Thus, the revolution of the gear 14 to the gear 8 is performed. If the solenoid 27a is deenergized when the gear 14 approaches the spur gear 8, the arm portion 20b of the clutch lever goes into the locus of the revolution of the gear 14 and then abuts against the planetary gear arm 13. Further, the gear 14 is in the position P14B, so that the revolution thereof is prevented.

When the aforesaid planetary gear arm 13 is in the position P13B, the planetary gear 14 engages with the spur gear 8. By keeping the sun gear portion 12b rotating in this state, the drive force of the motor 1 is transmitted from the sun gear portion 12b of the gear 12 to the spur gear 8 and the spur gear 18 provided on the rewinding shaft 51 through the planetary gear 14. Incidentally, in this case, the aforesaid gear 8 is driven to rotate only counter clockwise as viewed in FIG. 3. Further, the bevel gear 53a is rotated through the screw gear 51a. Moreover, the fork shaft 53 is driven. Thus, the rewinding of the film is performed.

During the rewinding operation, the torque is acted upon the spool shaft 52 of the spool chamber through the film. However, as above stated, the screw gear 50 having been engaged with the bevel gear 52a is driven smoothly by the aforesaid bevel gear 52a, so that the rewinding is performed without a hitch.

Figure 8:
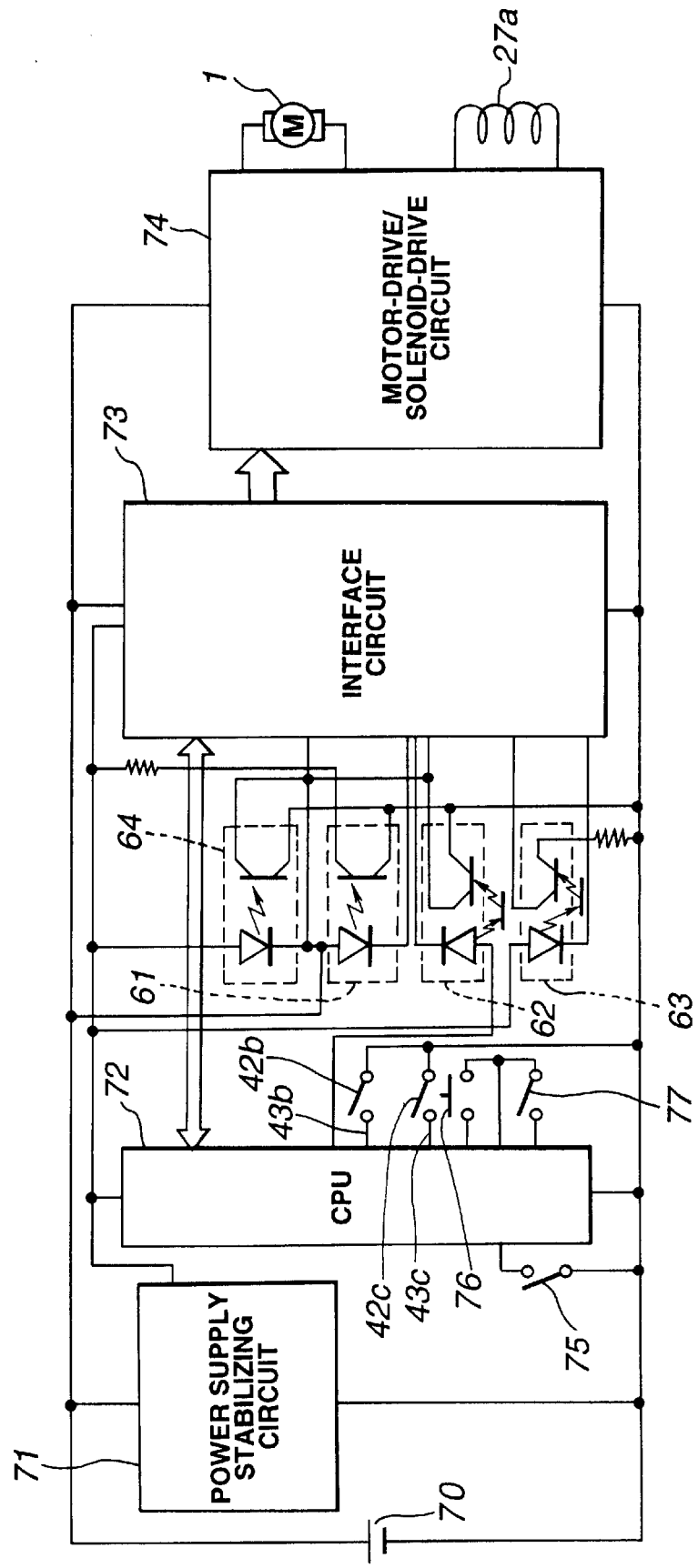
FIG. 8 is a schematic circuit diagram of an electric control circuit of the camera to which the drive mechanism of FIG. 1 is applied.

Next, an electric control circuit for the camera, which incorporates the drive mechanisms of this embodiment, will be described by referring to a schematic circuit diagram of FIG. 8 showing the electric control circuit.

The aforesaid electric control circuit has: a drive power source battery 70 for use mainly in a camera; a power supply stabilizing circuit 71 for stabilizing a power supply voltage; a central processing unit (CPU) 72 for performing a control operation of the camera; an interface circuit 73 for sending and receiving signals among various control units, control elements and CPU 72; and a drive circuit 74 for driving the aforesaid motor 1 and the solenoid 27a of the plunger unit 27.

Moreover, a main switch 75 and a release switch 76 and a rewind switch 77 of the camera are connected to the aforesaid CPU 72. Furthermore, the encoding patterns 43a, 43b and 43c provided on the encoder board 43 are also connected to CPU 72. Additionally, the terminals of light emitting or receiving elements of the photoreflectors 62 and 63 and the photointerrupters 61 and 64 are connected to CPU 72 through the interface circuit 73.

The aforesaid photoreflector 62 functions as a clutch and is operative to judge whether or not the planetary gear arm 13 reaches the rewinding position P13B. When this reflector is turned on, CPU 72 detects that the planetary gear 14 engages with the spur gear 8 for rewinding. Further, the photointerrupter 61 is used for detecting the rotation of the motor and is operative to detect the rotation state of the motor 1 by sensing the motion of the slit disk 1b which rotates between the light receiving and emitting elements thereof. Thereby, the advanced and retreated positions of the lens barrel 34 are controlled.

Photoreflector 63 is a sensing element for detecting film perforations and is operative to count the film perforations when winding film. Further, the photointerrupter 64 is provided in the lens barrel 34 and is operative to detect the motion of the rotation operation portion 38 for the arrow wheel 37. When this photointerrupter 64 is turned on, the open state of the shutter is detected. Moreover, CPU 72 controls shutter timing.

Next, a sequence of steps of a photographing process of the camera, which includes operations of the electric control circuit and the drive mechanisms configured as above described, will be described hereinbelow by referring to flowcharts of FIGS. 9 to 11, the electric circuit diagram of FIG. 8 and the sectional diagrams of the mechanisms as illustrated in FIG. 1 to 3. Incidentally, in the following description, the clockwise direction when viewed from the pinion side of the motor 1 is referred to as the direction of a normal rotation; and the counterclockwise direction when viewed from the pinion side of the motor 1 is referred to as the direction of a reverse rotation.

Figure 9:
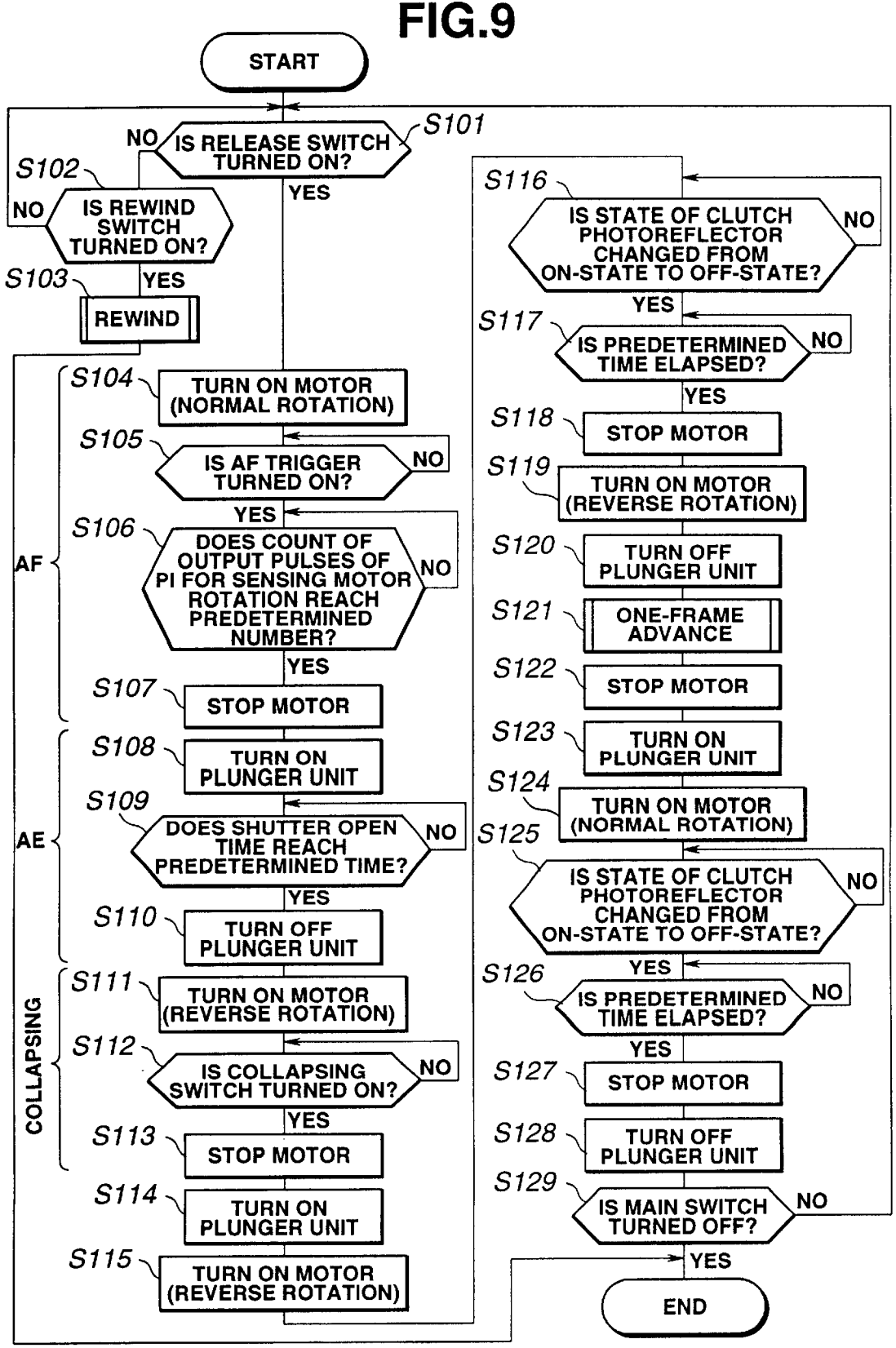
FIG. 9 is a flowchart of a program for performing a sequence of steps of a photographing process of the camera to which the drive mechanism of FIG. 1 is applied.

FIG. 9 is a flowchart of a program for performing a sequence of steps of an ordinary photographing process of the camera. In this sequence, first, the main switch 75 is turned on. Then, the voltage developed across the battery 70 is supplied to each of the control elements through the power-supply stabilizing circuit 72 in the camera. Thus, CPU 72, which has been in a sleep state, starts up. Then, it is monitored (in step S101) whether or not the release switch 76 is turned on.

If not, the program jumps to step S102 whereupon it is checked whether or not the rewind switch 77 is turned on. If turned on, a rewind subroutine of FIG. 10 (to be described later) is performed (in step S103) and thus a photographing state is completed.

In contrast, if the release switch 76 is turned on, automatic focusing (AF) operation is performed in steps S104 to S107. In the mechanisms, the motor 1 performs one-way rotation in the direction of a normal rotation. Such a rotation of the motor 1 causes the planetary gear 4 to rotate, because the carrier 2 cannot rotate at that time. Thus, the gear 3 is rotated. Further, as a consequence, the screw shaft 32 is rotated. Finally, the lens barrel 34 is caused to advance in the forward direction of the optical axis 0.

Thereafter, in step S105, it is monitored whether or the AF trigger is turned on. Namely, it is detected whether or not the armature 42b having been electrically grounded at all times is electrically connected with the pattern 43b. When the armature 42b is electrically connected therewith, the program goes to step S106. This position, at which the electrical connection of this armature therewith is detected, is used as a trigger position for detecting the advanced position of the lens barrel 34 in AF operation. Thence, the motor 1 keeps rotating, so that the lens barrel 34 is further advanced in the forward direction.

In the step S106, it is monitored whether or not pulse signals of a number predetermined by CPU 72 from the aforesaid trigger position are outputted from the photointerrupter (hereunder abbreviated as PI) 61 for detecting the rotation of the motor 1. When the number of detected pulse signals is matched with the predetermined number of pulse signals, it is judged that the lens barrel 34 reaches the predetermined position for focusing. Thus, an operation of driving and causing the motor 1 to rotate is stopped (in step S107). In this state, the automatic focusing (AF) operation is stopped. In the state in which the aforementioned automatic-focusing-operation is completed, the rotation operation portion 38 for the arrow wheel 37 is in the position P38A', which is the shutter closing position, because the portion 38 is placed in the lens barrel 34.

Then, if the plunger unit 27 is turned on in step S108, namely, if the solenoid 27a is energized, the moving core 27b is attracted and the clutch lever 20 moves against the pushing force of the closing spring 48 leftwardly, as viewed in FIG. 3, to the evacuation position P20B. On the other hand, the rotation operation portion 38 is moved by the pushing force of the spring 47 leftwardly, as viewed in this figure, to the shutter opening position P38B. By this movement of the portion 38, the sector 39 is released and the shutter is put into the opened state.

When performing this shutter opening operation, the photointerrupter of FIG. 8 is linked with the movement of the rotation operation portion 38 and is turned on. Further, the aforesaid opened state of the shutter is detected, so that a timing operation for automatic exposure is triggered.

Next, at step S109, it is monitored whether or not a shutter open time reaches the length of a time period, which is predetermined by CPU 72. After the elapse of the necessary shutter open time period, the plunger unit 27 is turned off in step S110. Namely, the solenoid 27a is deenergized.

In response to the deenergization of the aforesaid solenoid 27a, the clutch lever 20 returns to the engaging position P20A in the initial condition illustrated in FIG. 3. Then, the arm portion 20c presses and causes the rotation operation portion 38 for the arrow wheel 37 to move. Thus, the shutter is put into the closed state thereof. As a result of performing a process composed of the aforesaid steps S108 to S110, the automatic exposure (As) operation is completed.

Upon completion of the aforementioned film exposure operation, the camera moves the lens barrel 34 to the collapsing position P34A which is the initial position thereof. Namely, when rotate the motor in the direction of a reverse rotation, which is different from the aforementioned driving direction, in step S111, the lens barrel 34 comes to retreat in the direction of the optical axis O, because the carrier 2 does not rotate similarly as in the aforementioned case.

Then, it is monitored in step S112 whether or not a collapsing switch is turned on. Namely, it is monitored whether or not the armature 42c is off, namely, disconnected from the pattern 43c. If off, it is judged that the lens barrel 34 is located at the collapsing position P34A, and then the motor 1 is stopped in step S113. Thus, a collapsing operation is finished.

Subsequently from the aforementioned collapsing operation, exposed film needs winding up. Then, in step S114, the plunger unit 27 is turned on, namely, the solenoid 27a is energized so that the clutch lever 20 is retreated from the locus of the revolution of the planetary gear 14. Further, in step S115, the motor 1 is reversed. This reverse drive operation causes the planetary gear 14 to perform the counterclockwise revolution as viewed in FIG. 3, and the planetary gear 14 comes to engage with the gear 19 for driving the film wind drive mechanism 25.

When driving the aforesaid planetary gear 14, the gear 3 tries to rotate or drive the lens barrel 34 to move from the collapsing position backwardly, namely, to the direction of the advanced position along the optical axis O. However, the lens barrel 34 is mechanically restrained from moving from the collapsing position to the advanced position thereof. Thus, the lens barrel 34 remains stopped at the aforesaid collapsing position P34A. Consequently, the gear 3 stops rotating. The rotation of the motor 1 is transmitted only to the carrier 5. Further, the motor 1 drives the planetary gear 14 through the sun gear portion 12b of the gear 12 to perform the aforementioned revolution.

As a result of the aforementioned revolution, the aforesaid planetary gear 14 comes to engage with the gear 19. Further, for the purpose of insuring the engagement between the gears 14 and 19, it is detected by the photoreflector 62 for the clutch whether or not the planetary gear arm 13 securely moves during the revolution of the gear 14. To that end, in step S116, it is monitored whether or not the reflecting plate 13a of the planetary gear arm 13 passes through a position opposite to the photoreflector 62, namely, whether or not the state of the photoreflector 62 is changed from an on-state to an off-state.

If it is detected in the aforementioned step S116 the state of the photoreflector 62 is changed from the on-state to the off-state, the rotation of the motor 1 is maintained for a certain constant time period in step S117. Thus, it is monitored whether or not this predetermined constant time period has passed. If passed, the rotation of the motor 1 is stopped once in step S118.

Then, in step S119, the motor 1 is further reversed. Moreover, when the gears 14 and 19 are engaged with each other, an operation of winding the film is commenced. Furthermore, in step S120, the solenoid 27a of the plunger 27 is deenergized. The clutch lever 20 is returned to the initial engaging position P20A. Subsequently, in step S121, a subroutine for one-frame advance of the film is executed. Upon completion of this one-frame advance, the motor 1 is stopped in step S122.

When the aforementioned operation of winding the film is completed, the solenoid 27a of the plunger 27 is energized in step S123 so as to return the camera to the initial state. Thus, the clutch lever 20 is retreated again from the position on the locus of the aforesaid revolution of the gear 14.

Subsequently, in step S124, the motor 1 is caused to perform normal rotation. At that time, the gear 3 tries to rotate. However, a load put on the driven system connected posterior to the gear 12 is smaller than the load put on the lens barrel drive system. Thus, by the action of the aforesaid differential gear, the lens barrel drive system is not driven. Furthermore, the drive force of the motor 1 is transmitted from the side of the carrier 5 to the gear 12.

When the sun gear portion 12b of the gear 12 is driven clockwise owing to the rotation of the carrier 5, the planetary gear 14 starts the aforementioned revolution and thus comes to engage with the sector gear 7b. Simultaneously with this, the planetary gear arm 13 abuts against the stopper 56d. During this time, for the purpose of checking whether this revolution is securely performed, it is monitored whether or not the reflecting plate 13a of the planetary gear arm 13 passes through a facing position after the reflecting plate 13a of the planetary gear arm 13 faces the photoreflector 62 for the clutch at the facing position. Namely, in step S125, it is monitored whether not the state of the photoreflector 62 is changed from the on-state to the off-state. If changed from the on-state to the off-state, for the purpose of causing the gear 14 to securely engage with the sector gear 7b, it is monitored in step S126 whether or not a predetermined time period has passed. After the lapse of this predetermined time period, the motor 1 is stopped in step S127.

Thereafter, the solenoid 27a of the plunger 27 is deenergized in step S128. Thus, the clutch lever 20 is returned to the initial engaging position P20A. Consequently, the device is returned to the initial state. In step S129, it is checked whether or not the main switch is turned off. If turned off, the power supply for the camera is turned off. In contrast, if not turned off, the program jumps to step S101 whereupon the device is put into a state in which the device waits for the turning-on of the release switch 76.

Next, a subroutine for performing a film rewinding operation will be described hereunder by referring to the flowchart of FIG. 10.

Figure 10:
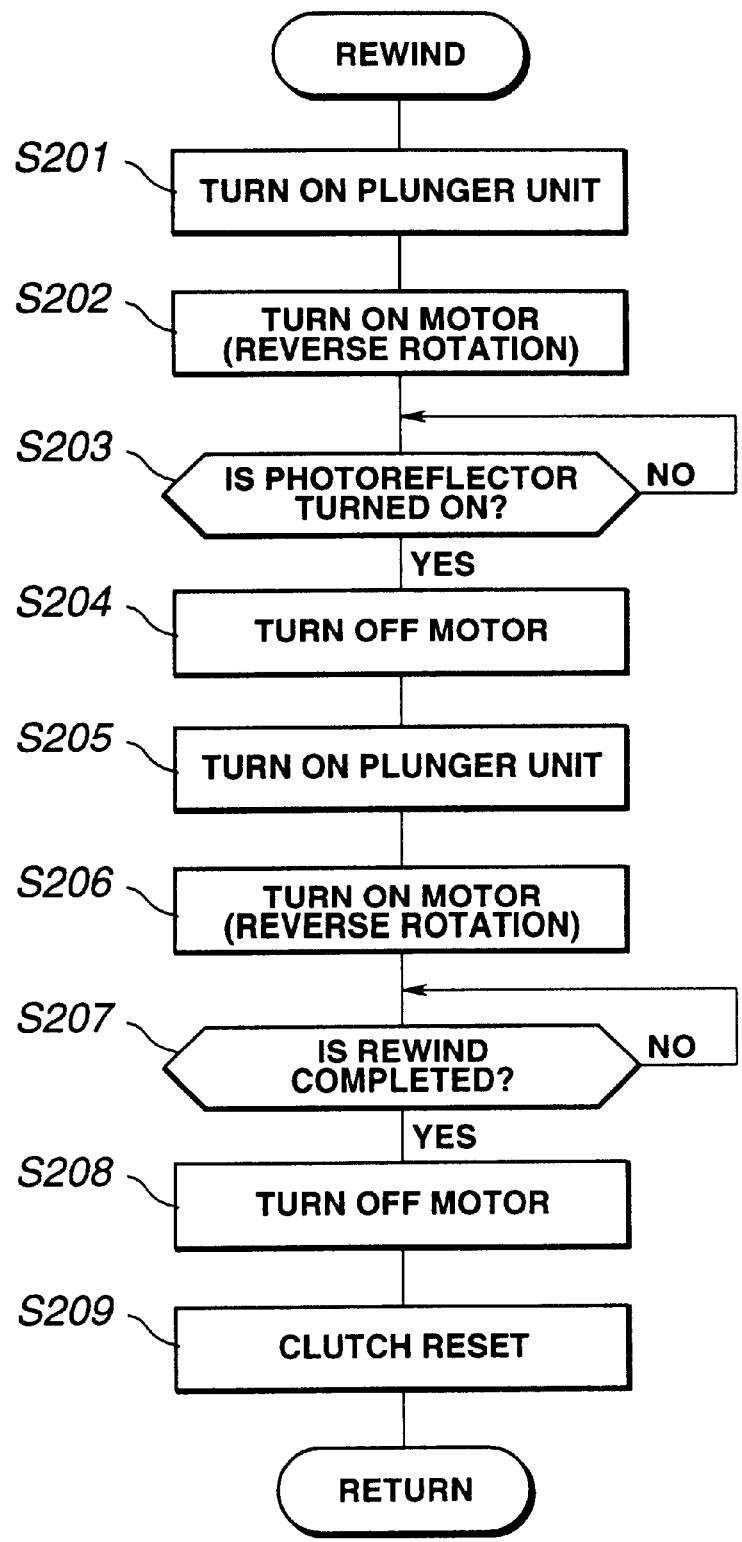
FIG. 10 is a flowchart of a subroutine for performing a film rewinding operation, which is called in the photographing process.

During performing the sequence of steps of the photographing process in FIG. 9, if it is detected in step S102 that the rewind switch 77 (see FIG. 8) is turned on, the subroutine illustrated in FIG. 10 is called. Then, the film rewinding operation is performed.

Namely, in step S201, the solenoid 27a of the plunger unit 27 is energized, so that the clutch lever 20 is retreated from a position on the locus of the aforementioned revolution of the planetary gear 14. Then, if the motor 1 is reversed in step S202, the planetary gear 14 performs the counterclockwise revolution. Further, the reflecting plate 13a of the planetary gear arm 13 reaches the facing position at which the plate 13a faces the photoreflector 62, the photoreflector 62 is turned on. This state is monitored in step S203. Subsequently, the motor 1 is stopped in step S204. Simultaneously, the solenoid 27a of the plunger unit is deenergized in step S205, the clutch lever 20 is returned to the initial engaging position P20A.

As a result of the return of the clutch lever 20, the planetary gear arm 13 is placed between the arm portions 20a and 20b of the clutch lever 20. Subsequently, if the motor 1 is reversed in step S206, the planetary gear arm 13 is placed at the position P13B, at which time the planetary arm 13 abuts against the arm portion 20b of the clutch lever 20, owing to the aforementioned counterclockwise revolution of the gear 14. In this state, the planetary gear 14 engages with the spur gear 8 that has been engaged with the spur gear 18 for driving the film rewind drive mechanism 26. Therefore, the film winding operation is continued by causing the motor 1 to keep rotating around the axis thereof.

In step S207, it is monitored by CPU 72 whether or not the rewinding operation is completed. When completed, the motor 1 is stopped in step S208. Thereafter, in order to return the camera to the initial state or condition, a clutch reset operation of resetting the planetary gear arm 13 is performed in step S209. This clutch reset operation is the same as a process composed of steps S123 to S128 of the aforesaid flowchart of FIG. 9. After this reset operation, the photographing process by the camera, which is composed of the sequence of the aforementioned steps, is finished by putting the main switch of the camera into a state being equivalent to a state in which the main switch is turned off.

Next, a subroutine for a film end detection operation, which is performed when failing to wind one frame of the film in the middle of the film winding operation and thus suspending the film winding operation, will be described hereinbelow by referring to the flowchart of FIG. 11. Incidentally, this film end detection operation is performed by executing this subroutine in the one-frame advance operation corresponding to the aforementioned subroutine called in step S121 of FIG. 9.

First, in step S301, an output of the photoreflector 63 is monitored so as to observe whether or not the film is normally fed, by detecting a perforation of the film. If there is no pulse output corresponding to the movement of a film perforation within a predetermined time period, it is judged that the film end is reached or that the film stops halfway through a film feeding operation. If no change occurs in the aforesaid pulse output within a predetermined time period, the motor 1 is stopped in step S302.

Thereafter, the film should be rewound. To that end, it is necessary to return the planetary gear arm 13 to the initial state. Thus, an operation similar to the reset operation by the planetary gear arm 13 in step S209 of FIG. 10 for returning the camera to the initial state, namely, the same operation as composed of steps S123 to S128 of FIG. 9 is performed in a clutch reset process of step S303. Then, the rewinding operation is performed in step S304 by executing the aforementioned subroutine of FIG. 10. Subsequently, the photographing process by the camera, which is composed of the sequence of the aforementioned steps, is finished by putting the main switch of the camera into a state being equivalent to a state in which the main switch is turned off.

As above stated, in the case of the film drive device for a camera, namely, in the case of this embodiment, a rod-like shaft, on which a spur gear of the film drive mechanism is mounted, is applied thereto and further, this shaft is disposed therein by being inclined. Thus, the efficient placement of the composing elements of the device is realized. Moreover, the flexibility in placement of the composing elements is increased. Furthermore, by employing a drive mechanism, which is obtained by the combination of screw gears and bevel gears, as a drive force transmission gear for transmitting a drive force to a spool shaft or a fork shaft engaging with a cartridge, an operation of winding or rewinding the film is achieved without canceling the engagement between the screw gear and the bevel gear driven by the film at the time of winding or rewinding film. Consequently, the configuration of a mechanism portion is simplified. Moreover, a space occupied by the mechanism portion is decreased. Furthermore, the flexibility in designing the mechanism is increased. As a result, this invention is advantageous in reducing the size and weight of a camera. Moreover, the cost of a camera is reduced. In addition, the present invention provides a film drive mechanism for a camera, by which a reliable and secure drive operation is obtained.

What is claimed is:

1. A drive force transmission device for a camera, comprising:
   a spur gear included in a gear train of said drive force transmission device; and
   an engaging gear included in the gear train of said drive force transmission device, said engaging gear engaging said spur gear in such a manner that an axis of rotation of said engaging gear obliquely crosses an axis of rotation of said spur gear.

2. A drive force transmission device for a camera according to claim 1, wherein said engaging gear is also a spur gear.

3. A drive force transmission device for a camera, comprising:

a spur gear in a gear train of said drive force transmission device; and an engaging gear included in the gear train of said drive force transmission device, said engaging gear engaging said spur gear in such a manner that an axis of rotation of said spur gear and said engaging gear are nonparallel.

4. A drive force transmission device for a camera according to claim 3, wherein said gear is also a spur gear.

5. A drive force transmission device for a camera, comprising:

a first spur gear included in a gear train of said drive force transmission device; and a second spur gear included in the gear train of said drive force transmission device, an axis of rotation of said second spur gear being arranged to be nonparallel with an axis of rotation of said first spur gear whereby to make said second spur gear engage said first spur gear.

* * * * *

UNITED STATES PATENT AND TRADEMARK OFFICE
CERTIFICATE OF CORRECTION

PATENT NO.    : 6,295,420 B1
DATED         : September 25, 2001
INVENTOR(S)   : Katagiri et al.

It is certified that error appears in the above-identified patent and that said Letters Patent is hereby corrected as shown below:

Column 1,
Line 13, before the word "Conventional", insert therefor -- A --
Line 28, delete "increase" and insert therefor -- camera --
Line 65, after "uncoupled" insert therefor -- . --

Column 4,
Line 4, after "are" insert therefor -- each --

Column 15,
Line 3, after "not" insert therefor -- the --.

Signed and Sealed this

Sixteenth Day of April, 2002

Attest:

JAMES E. ROGAN
*Director of the United States Patent and Trademark Office*

*Attesting Officer*

UNITED STATES PATENT AND TRADEMARK OFFICE
CERTIFICATE OF CORRECTION

PATENT NO.    : 6,295,420 B1
DATED         : September 25, 2001
INVENTOR(S)   : Katagiri et al.

It is certified that error appears in the above-identified patent and that said Letters Patent is hereby corrected as shown below:

Column 1,
Line 13, change "Conventional" to -- conventional --.
Line 28, after "to" insert -- increase --.

Column 15,
Line 3, change to read -- Thereafter, in step S105, it is monitored whether or not the AF --.

Signed and Sealed this

Twenty-ninth Day of October, 2002

Attest:

Attesting Officer

JAMES E. ROGAN
Director of the United States Patent and Trademark Office